United States Patent Office 3,718,665
Patented Feb. 27, 1973

3,718,665
AZABICYCLO-(N)-ALKYLENE-5,11-DIHYDRODI-
BENZOXA (OR THIA) ZEPINES
Harry L. Yale, New Brunswick, N.J., assignor to E. R.
Squibb & Sons, Inc., New York, N.Y.
No Drawing. Filed Sept. 30, 1970, Ser. No. 77,035
Int. Cl. A61k 27/00; C07d 87/54, 93/42
U.S. Cl. 260—327 B        9 Claims

ABSTRACT OF THE DISCLOSURE

Dihydrodibenzoxa (or thia) zepines are provided having the structure

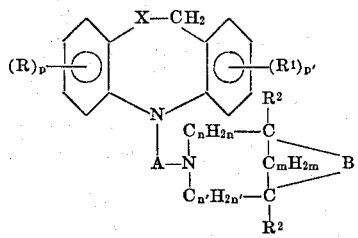

which are useful as antihypertensive agents.

The present invention relates to dihydrodibenzoxa (or thia) zepines having the structure (I)

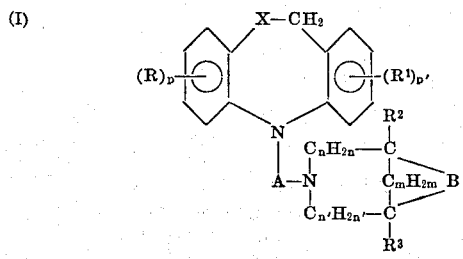

wherein R and $R^1$ can be the same of different and represent hydrogen, halogen, and trifluoromethyl, at least one of R and $R^1$ being other than hydrogen, $p$ and $p'$ represent the number of substituents other than hydrogen on the benzene rings, $p$ and $p'$ are 0 to 2, with at least one of $p$ and $p'$ being at least 1 and the total of $p$ and $p'$ being 3 or less; X is oxygen or sulfur, A is lower alkylene containing from two to about eight carbon atoms; B stands for a 1- to 5-membered hydrocarbon chain which may also contain a double bond or be interrupted by a nitrogen atom, which may be unsubstituted or substituted by an alkyl or aralkyl group, $m$ stands for any one of the numbers from 1 to 6, $n$ and $n'$ for any one of the numbers from 0 to 3, $R^2$ and $R^3$ for hydrogen or lower alkyl, with the proviso that $C_m H_{2m}$ separates the bridge-head atoms by at most 2 carbon atoms, and in which $$m+n+n' \geq 2$$

when B forms a 3- to 5-membered isocyclic ring with the bridge members, and $m+n+n' \geq 1$ when B forms a 4-membered azacyclic ring with the bridge members.

The lower alkyl groups which can be included as $R^2$ and/or $R^3$ in the compounds of the invention include straight and branched chain saturated aliphatic groups containing up to eight carbon atoms, such as methyl, ethyl, propyl, isopropyl, butyl, sec-butyl, tert-butyl, isobutyl, amyl, isoamyl, hexyl, heptyl, octyl, iso-octyl and the like. Methyl and ethyl are preferred.

R and/or $R^1$ can include all four halogens but chlorine and bromine are preferred, especially the former.

The lower alkylene group A is a bivalent straight or branched chain saturated aliphatic hydrocarbon group having two to eight carbon atoms in the chain. Examples of suitable lower alkylene groups are ethylene, propylene, trimethylene, butylene, dimethylethylene or any bivalent radical corresponding to the above-mentioned lower alkyl groups.

The azabicycloalkyl group is preferably separated from the dihydrobenzoxa (or thia) zepine group by 2 to 3 carbon atoms of the alkylene (A) radical. The latter therefore represents more especially 1,2-ethylene, 1,1- 2,3- or 1,3-propylene, also 1,3-, 2,3- or 1,4-butylene, 1,4- or 1,5-pentylene.

Azabicycloalkyl radicals are preferably those of the Formulae II to IV

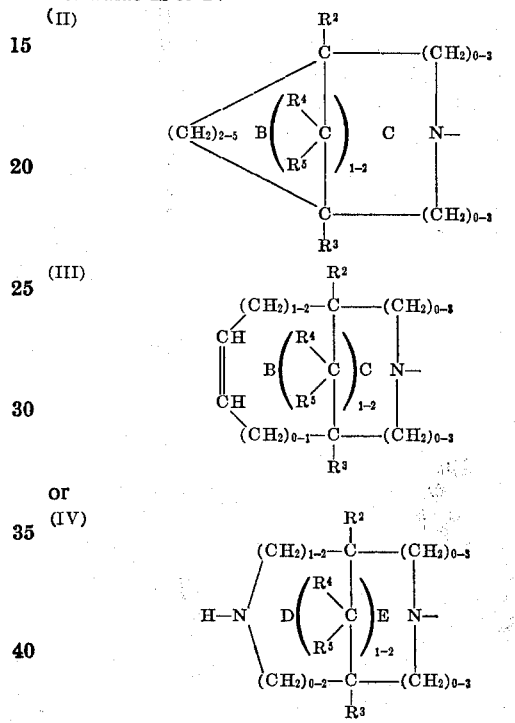

in which $R^2$, $R^3$, $R^4$ and $R^5$ stand for hydrogen or methyl, with the proviso that ring C contains at least 5 ring members and ring E at least 4 when ring B and ring D contain 5 and 4 ring members respectively.

Examples of azabicycloalkyl radicals are:

2-azabicyclo[3.2.0]heptyl-(3),7-azabicyclo[4.1.0]heptyl-(7);
2-azabicyclo[2.2.1]heptyl-(2);
6-azabicyclo[3.1.1]heptyl-(6);
7-azabicyclo[2.2.1]-heptyl-(7);
3-azabicyclo[3.3.0]octyl-(3);
2-azabicyclo[3.2.1]octyl-(2);
3-azabicyclo[3.2.1]octyl-(3);
1,8,8-trimethyl-3-azabicyclo[3.2.1]octyl-(3);
7-azabicyclo[3.2.1]octyl-(7);
2-azabicyclo[2.2.2]octyl-(2);
2-azabicyclo[4.3.0]nonyl-(2); 3-azabicyclo[4.3.0]nonyl-(3);
7-azabicyclo[4.3.0]nonyl-(7);
8-azabicyclo[4.3.0]nonyl-(8);
2-azabicyclo[3.3.1]nonyl-(2);
3-azabicyclo[3.3.1]nonyl-(3);
2-azabicyclo[3.2.2]nonyl-(2);
3-azabicyclo[3.2.2]nonyl-(3);
7-azabicyclo[4.4.0]decyl-(7);
8-azabicyclo[4.4.0]decyl-(8);
10-azabicyclo[4.3.1]decyl-(10);
8-azabicyclo[4.3.1]decyl-(8);
2-azabicyclo[5.4.0]undecyl-(2);

4-azabicyclo[5.4.0]undecyl-(4); or
7-azabicyclo[4.3.0]non-3-enyl-(7);
8-azabicyclo[4.3.0]non-3-enyl-(8);
7-azabicyclo[4.4.0]dec-3-enyl-(7);
8-azabicyclo[4.4.0]dec-3-enyl-(8);
3-azabicyclo[3.2.1]oct-6-enyl-(3) or
2,5-diaza-bicyclo[2.2.0]hexyl-(2);
4,8-diaza-bicyclo[4.3.0]nonyl-(8);
2,7-diaza-bicyclo[4.4.0]decyl-(2 or
3,7-diaza-bicyclo[3.3.1]nonyl-(3).

Preferred are those compounds wherein $R^2$ and $R^3$ are hydrogen, R is 7-$CF_3$, $R^1$ is hydrogen, $R^1$ is 3-$CF_3$, R is hydrogen; $R^1$ is hydrogen, R is C-Cl, $R^1$ is 3-Cl, R is hydrogen or R is 7-Cl and $R^1$ is 3-Cl; B is —$CH_2CH_2$—, $n$ is 1, $n'$ is 1, and $m$ is 2.

Examples of compounds falling within the present invention include but are not limited to the following:

5-[3-(3-azabicyclo[3.2.2]non-3-yl)propyl]-5,11-dihydro-7-(trifluoromethyl)dibenz[b,e][1,4-oxazepine;
5-[2-(3-azabicyclo[3.2.2]non-3-yl)ethyl]-5,11-dihydro-7-(trifluoromethyl)dibenz[b,e][1,4]oxazepine;
5-[4(3-azabicyclo[3.2.0]hept-3-yl)butyl]-5,11-dihydro-7-(trifluoromethyl)dibenz[b,e][1,4]oxazepine;
5-[3-(3-azabicyclo[3.2.2]non-3-yl)propyl]-5,11-dihydro-3-chlorodibenz[b,e][1,4]oxazepine;
5-[3-(3-azabicyclo[3.2.2]non-3-yl)propyl]-5,11-dihydro-7-chlorodibenz[b,e][1,4]oxazepine;
5-[3-(3-azabicyclo[3.2.2]non-3-yl)propyl]-5,11-dihydro-3,7-dichlorodibenz[b,e][1,4]oxazepine;
5-[3-(3-azabicyclo[3.2.2]non-3-yl)propyl]-5,11-dihydro-2-bromo-3-chlorodibenz[b,e][1,4]oxazepine;
5-[5-(7-azabicyclo[4.1.0]hept-7-yl)pentyl]-5,11-dihydro-3-(trifluoromethyl)dibenz[b,e][1,4]thiazepine;
5-[6-(2-azabicyclo[2.2.1]hept-2-yl)hexyl]-5,11-dihydro-3,7 (or 7,8 or 2,3)-di(trifluoromethyl)dibenz[b,e][1,4]thiazepine;
5-[3-(3-azabicyclo[3.3.0]oct-3-yl)propyl]-5,11-dihydro-2-bromodibenz[b,e][1,4]oxazepine;
5-[2-(2-azabicyclo[3.3.1]oct-2-yl)ethyl]-5,11-dihydro-2,8-dichlorodibenz[b,e][1,4]oxazepine;
5-[7-(1,8,8-trimethyl-3-azabicyclo[3.2.1]-oct-3-yl)heptyl]-5,11-dihydro-3-(trifluoromethyl)dibenz[b,e][1,4]thiazepine;
5-[8-(2-azabicyclo[2.2.2]-oct-2-yl)-oct-2-yl]-5,11-dihydro-6-(trifluoromethyl)-7-iododibenz[b,e][1,4]oxazepine;
5-[2-(2-azabicyclo[4.3.0]non-2-yl)ethyl]-5,11-dihydro-3-(trifluoromethyl)-7-chlorodibenz[b,e][1,4]thiazepine;
5-[3-(3-azabicyclo[4.3.0]non-3-yl)propyl]-5,11-dihydro-p-(trifluoromethyl)dibenz[b,e][1,4]oxazepine;
5-[3-(7-azabicyclo-[4.3.0]non-7-yl)propyl]-5,11-dihydro-7,8-di-(trifluoromethyl)dibenz[b,e][1,4]thiazepine;
5-[6-(7-azabicyclo[4.4.0]dec-7-yl)hexyl]-5,11-dihydro-2,7-dichlorodibenz[b,e][1,4]thiazepine;
5-[2-(8-azabicyclo[4.4.0]dec-8-yl)ethyl]-5,11-dihydro-4-bromodibenz[b,e,][1,4]oxazepine;
5-[3-(2-azabicyclo[5.4.0]undec-2-yl)propyl]-5,11-dihydro-9-chlorodibenz[b,e][1,4]thiazepine;
5-[2-(4-azabicyclo[5.4.0]undec-4-yl)ethyl]-5,11 dihydro--1-chlorodibenz[b,e][1,4]oxazepine;
5-[3-(7-azabicyclo[4.3.0]non-3-en-8-yl)propyl]-5,11-dihydro-7-(trifluoromethyl)dibenz[b,e][1,4]oxazepine; and
5-[2-(7-azabicyclo[4.4.0]dec-3-en-7-yl)ethyl]-5,11-dihydro-3-(trifluoromethyl)dibenz[b,e][1,4]thiazepine.

The compounds of the invention can be prepared by reacting a compound of the structure.

(V)

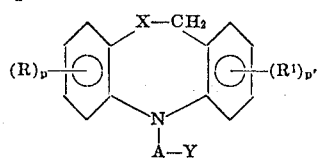

wherein R, $R^1$, $p$, $p'$, X and A are as defined hereinbefore and Y is halogen, preferably chloro, with a compound of the structure (VI)

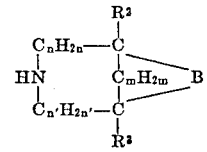

wherein B, $R^2$, $R^3$, $n$, $n'$ and $m$ are as defined hereinbefore, in the absence of oxygen, in a molar ratio of V:VI of within the range of from about 0.5:1 to about 1:1, at a temperature within the range of from about 50 to about 150° C., in the presence of an inert solvent such as methyl ethyl ketone, pentane, hexane, benzene, toluene, xylene or an inorganic base such as barium oxide or potassium carbonate, and an alkali metal halide such as sodium iodide, potassium iodide, sodium bromide, or potassium bromide in catalytic amounts ranging up to one equivalent.

Alternatively, the compounds of Formula I can be prepared by reacting a compound of the structure (VII)

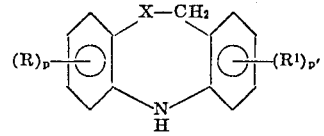

with a compound of the structure (VIII)

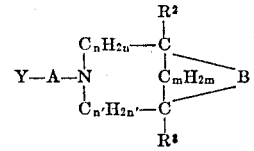

wherein R, $R^1$, $p$, $p'$ X, A, B, Y, $n$, $n'$, $R^2$, $R^3$ and $m$ are as defined hereinbefore, in the absence of oxygen, in a molar ratio of VII:VIII of within the range of from about 0.75:1 to about 1:1, at a temperature within the range of from about 50 to about 150° C.

Suitable starting materials of the Formula V include: 5-(chloro-lower alkyl)-7-(trifluoromethyl)-5,11-dihydrodibenz[b,e][1,4]oxa (or thia) zepines, such as the 5-(2-chloroethyl), the 5-(3-chloropropyl) and the 5-(3-chlorobutyl) derivatives; 5-(chloro-lower alkyl)-7-halo-5,11-dihydrodibenz[b,e][1,4]oxazepines, such as the 5-(2-chloroethyl)-7-chloro, 5-(3-chloropropyl)-7-chloro, and 5-(3-chloropropyl)-7-bromo derivatives; 5-(chloro-lower alkyl) - 3 - (trifluoromethyl)-5,11-dihydrodibenz[b,e][1,4] oxa (or thia) zepines, such as the 5-(2-chloroethyl), the 5-(3-chloropropyl) and the 5-(5-chloropentyl) derivatives; 5-(chloro-lower alkyl)-3-halo-5,11-dihydrodibenz[b,e][1,4]oxa (or thia) zepines, such as the 5-(2-chloroethyl)-3-fluoro, 5-(3-chloropropyl)-3-chloro, and 5-(4-chlorobutyl)-3-chloro derivatives; 5-(chloro-lower alkyl)-3,7-di(trifluoromethyl) - 5,11 - dihydrodibenz[b,e,][1,4] oxa (or thia) zepines, such as the 5-(2-chloroethyl) and 5-(3-chloropropyl) derivatives; 5-(chloro-lower alkyl)-3,7-dihalo - 5,11 - dihydrodibenz[b,e][1,4]oxa (or thia) zepines, such as the 5-(2-chloroethyl)-3,7-dichloro, the 5-(3-chloropropyl-3-chloro-7-bromo derivatives; 5-(chloro-lower alkyl) - 3-(trifluoromethyl)-7-halo-5,11-dihydrodibenz[b,e][1,4]oxa (or thia) zepines, such as the 5-(2-chloroethyl)-3-(trifluoromethyl)-7-chloro derivative; 5-(chloro-lower alkyl) - 3-halo-7-(trifluoromethyl)-5,11-dihydrodibenz[b,e][1,4]oxa (or thia) zepines, such as the 5 - (3-chloropropyl)-3-chloro-7-(trifluoromethyl) derivative; and 5-(chloro-lower alkyl)-2,3-dihalo-5,11-dihydrodibenz[b,e][1,4]oxa (or thia) zepines such as the 5-(3-chloropropyl)-2-chloro-3-bromo derivative.

Starting materials of structure VII correspond to those of structure V wherein the haloalkyl substituent at the 5-position is replaced by a hydrogen.

Starting materials of structures VI and VIII include azabicyclo radicals as set out hereinbefore.

The compounds of Formula I form salts and quaternary ammonium compounds which are also part of this invention. The salts include acid addition salts, particularly the non-toxic physiologically acceptable acid addition salts, which are formed by reaction of the base of Formula I with the appropriate acid. Acids useful for preparing the acid addition salts include, for example, inorganic acids, such as the hydrohalic acids (e.g., hydrochloric and hydrobomic acid), sulfuric acid, nitric acid, boric acid and phosphoric acid and organic acids, such as oxalic, tartaric, maleic, fumaric, pamoic, malic, citric, acetic, succinic, benzenesulfonic and toluenesulfonic acid. The acid addition salts frequently provide a convenient means for isolating the product, e.g., by precipitating the salt in an appropriate menstruum in which the salt is insoluble, then, after separation of the salt, neutralizing with a base such as barium hydroxide or sodium hydroxide, to obtain the free base of Formula I. Other salts may then be formed from the recovered base.

The new azabicyclo compounds of the invention or salts thereof may also be converted into quaternary ammonium compounds, for example by reaction with a reactive ester of a lower alkanol or aralkanol, such as a lower alkyl or aralkyl halide, for example methyl, ethyl, n-propyl or iso-propyl or benzyl chloride, bromide or iodide, a di-lower alkyl sulfate, such as dimethyl or diethyl sulfate, or a lower alkyl ester of alkane-sulfonic or aryl-sulfonic acid, such as methane, ethane or paratoluene-sulfonic acid methyl or ethyl ester.

Quaternization is performed advantageously in the presence of a diluent for example in a lower alkanol, such as methanol, ethanol, n-propanol, iso-propanol or tertiary butanol, a lower alkanone, such as acetone or methylethyl ketone, or an organic acid amide, such as formamide or dimethylformamide.

The compounds of this invention find unique utility when used as agents in the treatment of hypertension. At the relatively low daily dose range of about 4 mg. to about 12 mg., and optimally about 5 mg. to 10 mg. per kilogram body weight of the mammal (e.g., a dog, cat and preferably man) being treated, the compounds of this invention display a high degree of activity in reduicng blood pressure. The above ranges apply whether the compounds are administered perorally or parenterally (e.g., subcutaneously or intramuscularly).

As stated above, the compounds can be administered either perorally or parenterally. For peroral administration the compounds are preferably formulated in solid unit dosage form in the usual manner. Thus the compounds can be admixed with a diluent, such as milk sugar; a binder, such as ethyl cellulose; a lubricant, such as talc and/or magnesium stearate and a disintegrant such as corn starch, and compressed in the usual manner to form tablets containing about 25 mg. to about 300 mg. of active compound per tablet; or they can be encapsulated in two-piece gelatin capsules, together with a diluent such as milk sugar to give capsules containing about the same weights of active compound per capsule.

For parenteral administration the compounds are suspended or dissolved in a suitable parenterally acceptable vehicle such as sterile water, sesame oil or corn oil. The compounds are preferably present in a concentration of about 5 mg. to about 500 mg., and optimally about 25 mg. to about 250 mg. per 5 cc. of final suspension or solution.

The following examples illustrate the invention (all temperatures being in centigrade):

EXAMPLE 1

5-[3-(3-azabicyclo[3.2.2]non-3-yl)propyl]-5,11-dihydro-7-(trifluoromethyl)dibenz[b,e][1,4]oxazepine To a stirred solution, in a nitrogen atmosphere, of 7.0 g. (0.02 mole) of 5-(3-chloropropyl)-5,11-dihydro-7-(trifluoromethyl)dibenz[b,e][1,4]oxazepine and 5.1 g. (0.045 mole) of 3-azabicyclo (3.2.2) nonane (Eastman Chem. Products) in 63 ml. of ethylmethyl ketone (analytical reagent) is added in one portion 3.36 g. (0.022 mole) of sodium iodide. The reaction mixture is brought to reflux and is refluxed for 21 hours. The solvent is removed in vacuo. The resulting residue is identified as the title compound.

EXAMPLE 2

5 - [3-(3-azabicyclo[3.2.2]non-3-yl)propyl]-5,11-dihydro-7 - (trifluoromethyl dibenz[b,e][1,4]oxazepine hydrochloride To the residue of Example 1 is added 25 ml. of water and the mixture is extracted with three 100 ml. portions of ether. The combined ether extracts are washed with water until the washings are neutral. The ether layer is extracted with 75 ml. of cold 10% HCl and while standing in the separatory funnel a white precipitate forms. The acid layer is separated and the ether layer extracted with two portions of 75 ml. of cold 10% HCl. The acid layers are combined and filtered yielding 6.3 g. (64%) of the crude product, M.P. 236–238° (decomp.), darkens at 210°. Recrystallization from 2-propanol yields 4.6 g. (48%) of the pure product, M.P. 239–240°.

*Analysis.*—Calcd. for $C_{25}H_{29}ON_2F_3 \cdot HCl$ (percent): N, 6.00; Cl, 7.59; N.E. ($HClO_4$), 467. Found (percent): N, 5.88; Cl, 7.82; N.E. ($HClO_4$), 457.

The analytical sample of the pure base is obtained as an oil by treatment of the recrystallized salt with sodium hydroxide.

*Analysis.*—Calcd. for $C_{25}H_{29}ON_2F_3$ (percent): N, 6.51; N.E. ($HClO_4$), 430. Found (percent): N, 6.38; N.E. ($HClO_4$), 422.

EXAMPLE 3

5-[3-(3-azabicyclo[3.2.2]non-3-yl)propyl]-5,11-dihydro-3-chlorodibenz[b,e][1,4]oxazepine By substituting 5-(3-chloropropyl)-5,11-dihydro-3-chlorodibenz[b,e][1,4]oxazepine for the oxazepine starting material in Example 1 and following the procedure of that example, the title compound is obtained.

EXAMPLE 4

5-[3,(3-azabicyclo[3.2.2]non-3-yl)propyl]5,11-dihydro-7-chlorodibenz[b,e][1,4]oxazepine By substituting 5-(3-chloropropyl)-5,11-dihydro-7-chlorodibenz[b,e][1,4]oxazepine for the oxazepine starting material in Example 1, and following the procedure of that example, the title compound is obtained.

EXAMPLE 5

5-[3-(3-azabicyclo[3.2.2]non-3-yl)propyl]-5,11-dihydro-3,7-dichlorodibenz[b,e][1,4]oxazepine By substituting 5-(3-chloropropyl)-5,11-dihydro-3,7-dichlorodibenz[b,e][1,4]oxazepine for the oxazepine starting material in Example 1 and following the procedure of that example, the title compound is obtained.

EXAMPLE 6

5-[3-(3-azabicyclo[3,2,2]non-3-yl)propyl]-5,11-dihydro-2-bromo-3-chlorodibenz[b,e][1,4]oxazepine By substituting 5-(3-chloropropyl)-5,11-dihydro-2-bromo-3-chlorodibenz[b,e][1,4]oxazepine for the oxazepine starting material in Example 1, and following the procedure of that example, the title compound is obtained.

EXAMPLES 7 TO 25

By reacting the oxazepine or thiazepine shown in column 1 of Table 1 below with the azabicyclo compound shown in column 2, in accordance with the procedure of Example 1, there is obtained the product shown in column 3 of Table 1.

TABLE 1

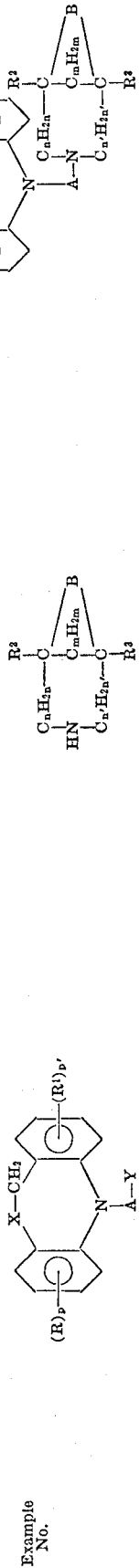

| Example No. | Column 1 | | | | | | | | Column 2 | | | | | Column 3 |
|---|---|---|---|---|---|---|---|---|---|---|---|---|---|---|
| | R | p | R' | p' | X | A | Y | | R² | R³ | n' | n | m | B |
| 7 | 8-$CF_3$ | 1 | 2-$CF_3$ | 1 | S | $(CH_2)_2$ | Cl | H | H | 1 | 1 | 2 | $(CH_2)_2$ | Same as in Column 1 and Column 2 |
| 8 | 7-Cl 6-Br | 2 | 3-$CF_3$ | 1 | S | $(CH_2)_4$ | Br | $CH_3$ | $CH_3$ | 2 | 1 | 1 | $CH_2$ | |
| 9 | H | — | 1-I | 1 | O | $(CH_2)_3$ | I | $C_6H_5$ | $CH_3$ | 1 | 0 | 0 | $(CH_2)_3$ | |
| 10 | 9-Cl 6-Cl | 2 | H | — | O | $(CH_2)_3$ | Cl | H | H | 2 | 2 | 2 | $(CH_2)_4$ | |
| 11 | 6-$CF_3$ | 1 | 3-$CF_3$ | 1 | O | $(CH_2)_6$ | Br | $C_2H_7$ | $C_2H_5$ | 3 | 3 | 2 | $(CH_2)_3$ | |
| 12 | H | — | 2-Cl-3-Br | 2 | S | $(CH_2)_3$ | Cl | $C_5H_{11}$ | H | 1 | 1 | 1 | $CH_2$ | |
| 13 | 8-Cl 9-Br | 2 | 2-Cl 9-Br | 2 | S | $(CH_2)_2$ | I | H | H | 1 | 1 | 2 | $(CH_2)_2$ | |
| 14 | H | — | 3-$CF_3$ | 1 | O | $(CH_2)_3$ | Br | H | H | 1 | 1 | 2 | CH=CH | |
| 15 | 7-$CF_3$ | 1 | 3-$CF_3$ | 1 | S | $(CH_2)_2$ | Cl | $CH_3$ | $CH_3$ | 2 | 1 | 2 | $-(CH_2)_2-N-(CH_2)_2-$ H H |
| 16 | 8-Cl | 1 | 2-$CF_3$ | 1 | O | $(CH_2)_3$ | I | $C_6H_5$ | $C_6H_5$ | 3 | 3 | 4 | $-CH_2-N-CH_2-$ |
| 17 | H | — | 3-Cl | 1 | S | $(CH_2)_3$ | Cl | H | H | 3 | 1 | 5 | $-CH_2-CH=CH-$ |
| 18 | 9-Cl | 1 | 2-$CF_3$ | 2 | S | $(CH_2)_3$ | Cl | H | $C_5H_{11}$ | 1 | 2 | 4 | $(CH_2)_2$ |
| 19 | 8,9-di-Cl | 2 | 2,4-di-Br | 2 | S | $(CH_2)_4$ | Br | $C_6H_{13}$ | H | 1 | 1 | 2 | $(CH_2)_2$ |
| 20 | 6,8-di-Br | 2 | — | — | — | $(CH_2)_3$ | Cl | H | H | 1 | 2 | 2 | $(CH_2)_3$ |
| 21 | 7,8-di-$CF_3$ | 2 | 1,2-di-$CF_3$ | 2 | S | $(CH_2)_3$ | Cl | $CH_3$ | $CH_3$ | 3 | 1 | 2 | $(CH_2)_4$ |

What is claimed is:

1. A compound of the structure

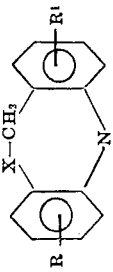

wherein R and R¹ can be the same or different and are selected from the group consisting of hydrogen, halogen and trifluoromethyl, at least one of R and R¹ being other than hydrogen; $p$ and $p'$ represent the number of substituents on the benzene rings and can be 0 to 2, at least one of $p$ and $p'$ being at least 1 and the total of $p$ and $p'$ being 3 or less; X is oxygen or sulfur, A is lower alkylene containing from two to eight carbon atoms; B is selected from the group consisting of a 1- to 5-membered alkylene chain, a 1- to 5-membered alkylene chain or a 1- or 5-membered alkylene chain interrupted by an —NH— group, $m$ is 1 to 6, $n$ and $n'$ are 0 to 3, R² and R³ are hydrogen or lower alkyl with the proviso that $C_mH_{2m}$ separates the bridge-head atoms by at most 2 carbon atoms, and $m+n+n' \geq 2$ when B forms a 3- to 5-membered isocyclic ring with the bridge members, and $m+n+n' \geq 1$ when B forms a 4- membered azacyclic ring with the bridge members; and an acid-addition salt thereof.

2. A compound in accordance with claim 1 having the structure

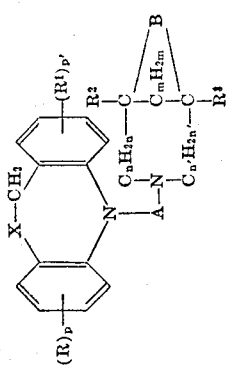

3. A compound in accordance with claim 2 wherein X is oxygen.

4. A compound in accordance with claim 2 wherein X is sulfur.

5. A compound in accordance with claim 2 wherein X is oxygen, R is 7-CF$_3$, R$^1$ is hydrogen, and A is —(CH$_2$)$_3$—.

6. A compound in accordance with claim 2 wherein X is oxygen, R is hydrogen, R$^1$ is 3-Cl, and A is —(CH$_2$)$_3$—.

7. A compound in accordance with claim 2 wherein X is oxygen, R is 7-Cl, R$^1$ is hydrogen and A is —(CH$_2$)$_3$—.

8. A compound in accordance with claim 2 wherein X is oxygen, R is C-Cl, R$^1$ is 3-Cl, and A is —(CH$_2$)$_3$—.

9. A compound in accordance with claim 2 wherein R is hydrogen, R$^1$ is 2-chloro-3-bromo, X is oxygen and A is —(CH$_2$)$_3$—.

References Cited

UNITED STATES PATENTS 3,133,936   5/1964   Yale et al. _____ 260—333

HENRY R. JILES, Primary Examiner

C. M. S. JAISLE, Assistant Examiner

U.S. Cl. X.R.

260—239 B, 239 BE, 293.54, 293.55, 326.55 A, 326.81, 333; 424—267, 274, 275, 278

UNITED STATES PATENT OFFICE
CERTIFICATE OF CORRECTION

Patent No. 3,718,665  Dated February 27, 1973

Inventor(s) Harry Louis Yale

It is certified that error appears in the above-identified patent and that said Letters Patent are hereby corrected as shown below:

Column 3, line 13, the term "C-Cl" should read: -- 7-Cl --.

Column 3, line 19, that portion of the compound reading:
" [1,4-oxazepine; " should be: -- [1,4]oxazepine; --.

Column 3, line 51, that portion of the compound reading:
"p-(tri" should be: -- 6-(tri --.

Column 5, line 42, the word "reduicng" should be: -- reducing --.

Column 6, line 62, that portion of the title reading:
"[3,2,2]" should be: -- [3.2.2] --.

Column 7, Example 12, Column 1, the R Column, please delete the plus sign (+).

Column 7, Example 5 under the R Column should read: --Example 15--.

Column 8, Claim 1, Column 2, line 13, after "and m+n+n'$\geq$2" please delete the following:
-- when B forms a 3- to 5-membered isocyclic ring with the bridge members, and m+n_n'$\geq$2 --.

Column 8, Claim 1, column 2, line 8, the word "alkylene" should by; -- alkenylene --.

Signed and sealed this 10th day of July 1973.

(SEAL)
Attest:

EDWARD M. FLETCHER, JR.
Attesting Officer

Rene Tegtmeyer
Acting Commissioner of Patents